3,186,144
PROCESSES AND APPARATUS FOR RECOVERING HYDROCARBONS FROM GAS STREAMS
Willard M. Dow, Houston, Tex., assignor, by mesne assignments, to National Tank Company, Tulsa, Okla., a corporation of Nevada
Filed Sept. 4, 1959, Ser. No. 838,275
24 Claims. (Cl. 55—20)

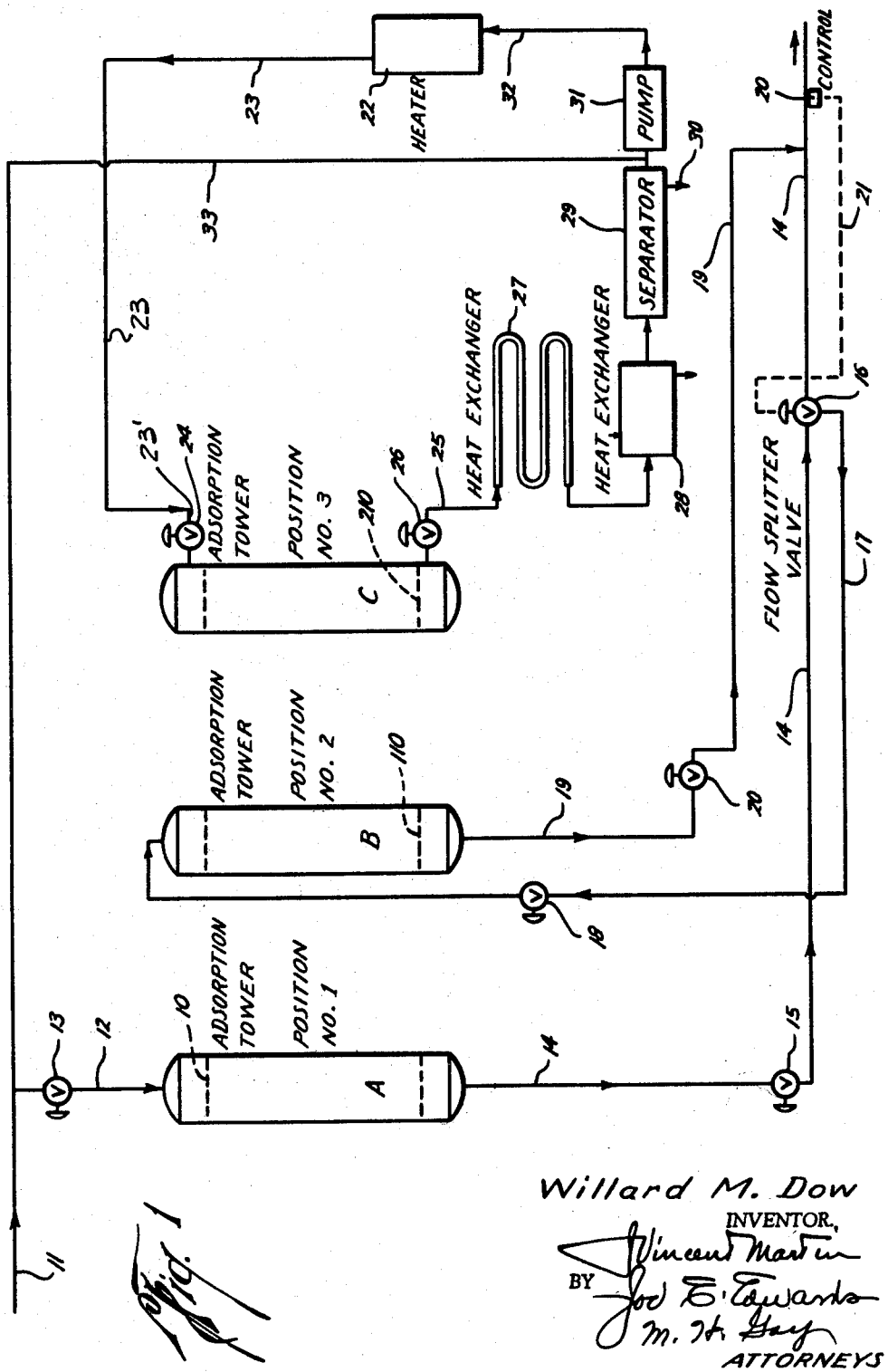

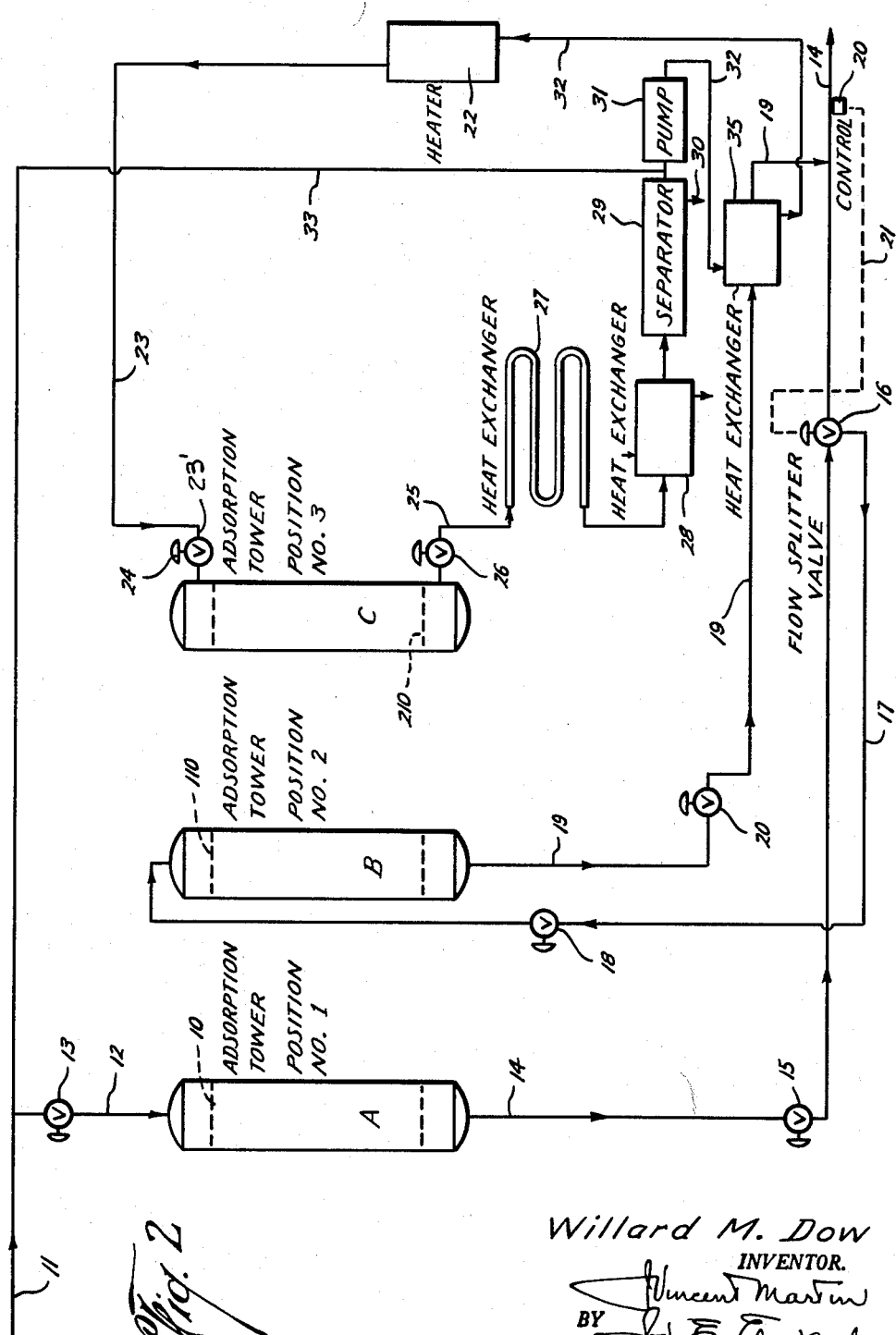

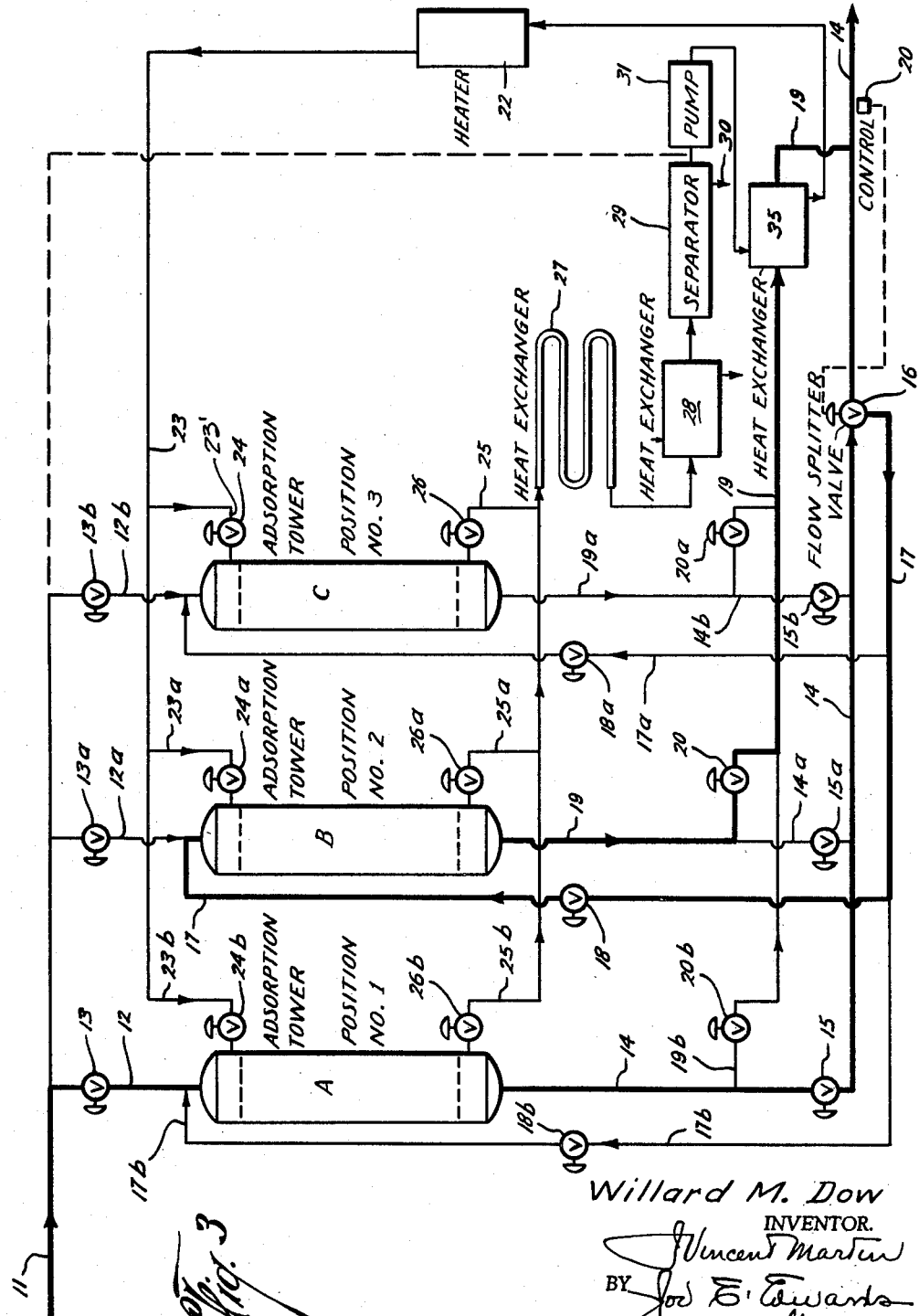

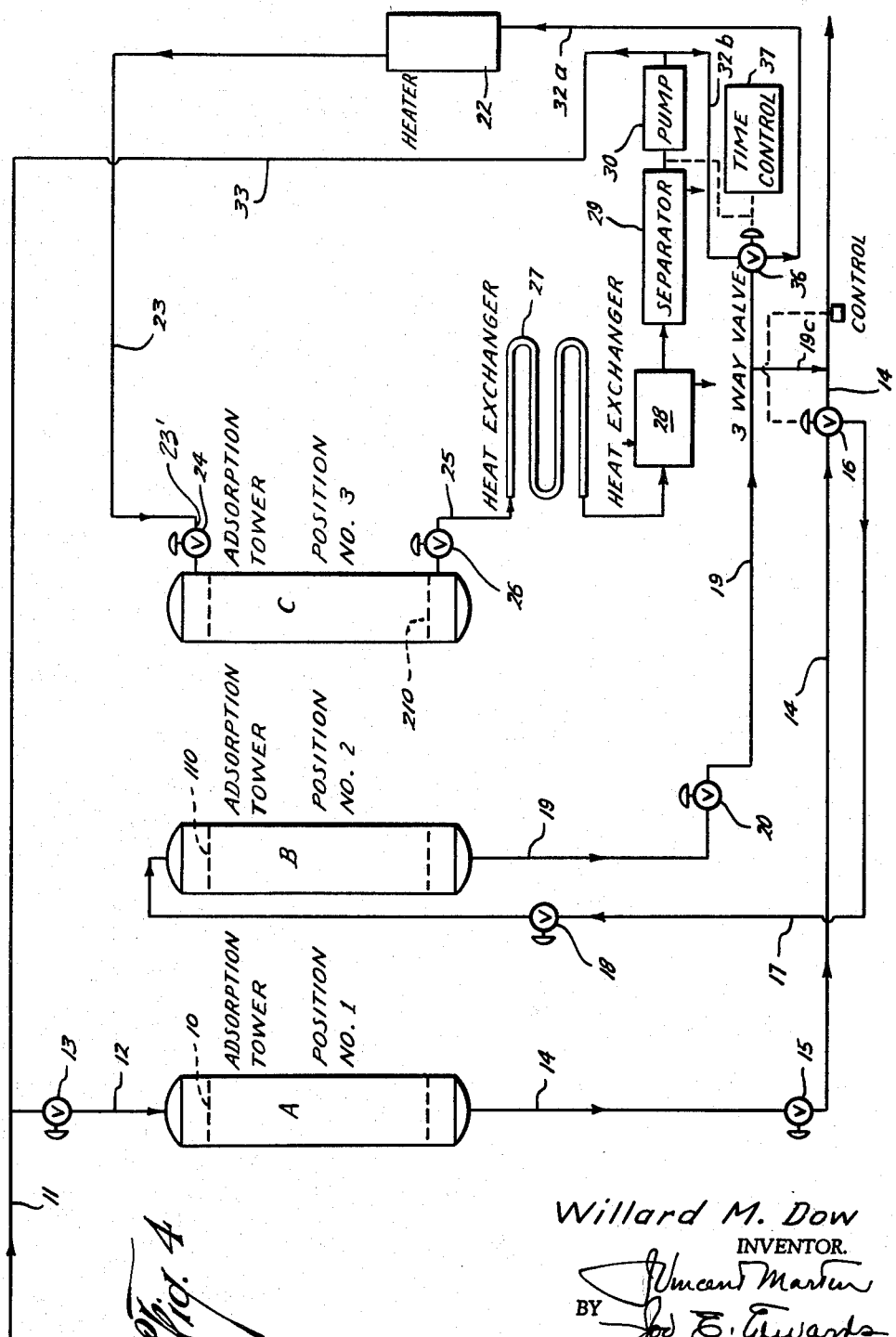

This invention relates to new and useful improvements in processes and apparatus for recovering hydrocarbons from gas streams.

The usual adsorption process includes an adsorption zone through which a main gas stream and a regeneration gas stream are alternately directed to place the zone on an adsorption cycle followed by a regeneration cycle. Ordinarily two adsorption zones are provided and the process is carried out in such manner that one zone is on adsorption while the other is being regenerated after which flow is switched, whereby the process is basically a cyclic batch-type operation. Since only a single zone is on the adsorption cycle at one time, only a single adsorption stage is available to adsorb the hydrocarbon fractions from the main stream and maximum utilization of adsorptive capacity of the adsorbent material is difficult to obtain in a single stage operation. Additionally, because of the inherent adsorptive characteristics of the adsorbent material, the composition of the main gas stream discharging from the adsorption zone is variable throughout the adsorption cycle and such variation in the composition of the main stream is undesirable because it results in variable recovery of hydrocarbon fractions.

Furthermore, because each zone is instantly switched from a regeneration to an adsorption cycle, it is necessary that a cooling period be provided at the end of each regeneration cycle in order to properly prepare the adsorbent material in each zone for the next succeeding adsorption cycle. Consequently, each cycle involves a heating period and a cooling period which not only increases cycle time but increases the heating requirements.

It is, therefore, one object of this invention to provide an improved process and apparatus for recovering hydrocarbon fractions from a main gas stream wherein two-stage adsorption is available to permit maximum utilization of the adsorptive capacity of the adsorbent material; wherein the composition of the stripped main gas stream discharging from the adsorption phase of the process may be controlled; wherein the time cycle of operation may be minimized; and also wherein regeneration heat requirements are reduced, all with more efficient recovery of the hydrocarbon fractions from the main gas stream.

An important object of the invention is to provide an improved adsorption process wherein three or more adsorption zones are employed and are so arranged that no cooling period in the regeneration cycle is required and at the same time, a second adsorption stage during the adsorption cycle is available; the additional adsorptive capacity of the second stage of the adsorption cycle and the elimination of the cooling period in the regeneration cycle effecting a reduction in the cycle time of the operation, whereby a net increase in operating efficiency in recovering the desirable hydrocarbon fractions is produced.

A particular object is to provide a process of the character described, wherein a first and second adsorption zone are so interconnected that the second zone may be utilized to function in proper time relationship to the need for a second adsorption stage, whereby the cyclic-type process is carried out in a manner to fully utilize its maximum adsorptive capacity and produce a relatively continuous steady-state recovery.

Another object is to provide a process, of the character described, wherein the second stage adsorption zone is connected in the adsorption circuit immediately following its having been heated and regenerated by the hot regeneration gas and also wherein a portion of the stripped or relatively lean main gas stream from the first stage adsorption zone is directed through said second stage adsorption zone during the early portion of the adsorption cycle whereby the main gas stream is employed to cool or at least partially cool said second stage zone in preparation for accomplishing its subsequent adsorption function.

A further object is to provide a process wherein three beds of adsorbent material are successively placed on first stage adsorption, second stage adsorption and regeneration; the first stage adsorption bed accomplishing the major removal of hydrocarbon fractions from the stream, the second stage adsorption bed being cooled during the start of the adsorption cycle and thereafter being available for second stage adsorption, and the third bed being regenerated by a heated regeneration stream. Successive shifting of the beds being such that upon completion of the adsorption and regeneration cycles, the first stage bed is connected in the regeneration circuit, the second stage bed becomes the first stage bed and the third bed becomes the second stage bed, whereby a cyclic batch-type operation is converted to a substantially continuous steady-state operation.

Another object is to provide a process, of the character described, which makes it possible by controlling the cycle time and the volume of the main gas stream which is diverted through the second stage adsorption zone to control the composition or the temperature, or both, of the discharging main gas stream, whereby the composition of the stripped main gas stream may be relatively constant to assure a substantially steady-state recovery of the desirable hydrocarbon fractions.

Still another object is to provide a process, of the character described, wherein the second stage adsorption zone may be associated with the regeneration gas circuit in such manner that the major portion of the heat which is retained in said second adsorption zone when the said zone is switched from regeneration to adsorption may be returned to the regeneration circuit; the arrangement also contemplating the purging of said second stage zone to return the enriched vapors to said regeneration circuit which vapors are present in said zone immediately following the removal of said zone from the regeneration circuit.

Another object is to provide an improved process which lends itself to use with the unique type of regeneration circuit disclosed in my prior patent.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIGURE 1 is a schematic flow diagram of the process and apparatus, constructed in accordance with the invention, FIGURE 2 is a similar view of a modified form of the invention, FIGURE 3 is a more detailed flow diagram illustrating the control valves and lines for switching flow through the various towers shown in FIGURES 1 and 2, and FIGURE 4 is a view similar to FIGURES 1 and 2 showing still another modification of the invention.

In the drawings (FIGURE 1) the letter A designates a vertical vessel or adsorbing tower which has a bed of adsorbent material 10 disposed therein. The particular adsorbent material which is employed is subject to variation, but it has been found that silica gel or activated charcoal are satisfactory for the purpose. Both of these materials have an adsorption affinity for the lighter hydrocarbon fractions such as propane and butane, and for gasoline fractions; in addition, silica gel will adsorb water so that where it is desired to dehydrate a gas stream, as well as recover hydrocarbons therefrom, silica gel may be preferable. The apparatus also includes a second vertical vessel, or adsorbing tower B having a similar bed 110 of adsorbent material therein, and a third vertical vessel or adsorbing tower C which is also provided with a bed 210 of adsorbent material.

As will be explained, two of the towers are adapted to be placed on an adsorption cycle while the third tower is on a regeneration cycle. Suitable equipment in the form of control and switching valves is provided so as to shift the flows through said towers in a manner to cause the towers to be shifted from one position to another. In FIGURE 1, a schematic flow diagram is illustrated with the towers A and B on the adsorption cycle and tower C on a regeneration cycle. Upon completion of the adsorption cycle, tower A is placed on regeneration and towers B and C are on an adsorption cycle; following completion of the next adsorption cycle, towers C and A will be on adsorption while tower B is being regenerated.

For the purposes of the present description, tower A is illustrated in "position No. 1," tower B is located in "position No. 2," and tower C is disposed in "position No. 3." With the towers in these three positions, a main gas stream inlet line 11 has connection through a branch line 12 with the upper end of adsorption tower A. A suitable control valve 13 is mounted in the branch line to control the flow of the main gas stream into tower A. A discharge conductor 14 extends from the lower end of tower A and said conductor has a suitable control valve 15 mounted therein. Also mounted within the discharge conductor 14 is a flow splitter valve 16 which is adapted to divide the flow which is passing through the conductor 14 between said conductor and a line 17. The line 17 extends upwardly to the upper end of tower B and has a suitable control valve 18 mounted therein. As will be explained, the position of the splitter valve is controlled in accordance with either the temperature or the composition of the gas stream discharging from the conductor 14, and the position of said valve will determine the volume of flow which is diverted from conductor 14 through the line 17 and into the tower B.

After passing through the tower B the diverted portion of the gas is discharged through a return line 19 having a valve 20 therein. The end of the return line 19 has connection with the main gas stream discharge conductor 14 at a point downstream of the flow splitter valve 16 whereby the diverted portion of the gas is recombined with the main gas stream and is conducted from the apparatus through said conductor 14. The particular control for the splitter valve which is actuated either in accordance with the temperature of the gas discharging through conductor 14, or in accordance with the composition of said gas, is indicated at 20 in FIGURE 1 and has connection with the flow splitter valve as indicated by the dotted line 21.

While the towers A and B are on an adsorption cycle, the tower C is being regenerated. This tower C is connected in a regeneration circuit which includes a heater 22. The discharge side of the heater is connected by a line 23 and branch line 23' with the upper end of the tower C, said line having a suitable control valve 24 connected therein. The heated regeneration gas within the regeneration circuit is directed through line 23 from the heater and into the upper end of tower C. This hot regeneration gas flows downwardly through the adsorbent bed 210 within the tower C and is discharged therefrom through a discharge conduit 25 which has a suitable control valve 26 therein. As the hot regeneration gas flows through the bed 210 of tower C, it extracts the adsorbed hydrocarbon fractions by vaporizing the same and said fractions in vaporized liquid form are discharged from tower C. The discharge conduit 25 conducts the regeneration gas having the vaporized fractions therein through a heat exchanger 27, which is illustrated as of the atmospheric type, wherein the gas is cooled; thereafter said regeneration gas flows through a second heat exchanger 28 which further cools said gas to condense the vaporized liquids. From the heat exchangers the gas is conducted to a separator vessel 29 wherein the condensed or liquid hydrocarbon fractions are separated and withdrawn through a liquid discharge line 30.

After passing through the separator 29 the regeneration gas stream is returned to the inlet side of a circulating pump 31 which has its discharge side connected through conduit 32 with the inlet side of the heater 22 to complete the cycle through the regeneration circuit.

The particular regeneration circuit is one of the type fully disclosed and described in my prior Patent No. 2,880,818 dated April 7, 1959. The circuit also includes a breather line or connection 33 which has one end connected to the regeneration circuit at a point between the separator 29 and pump 31; the other end of the line has connection with the main gas stream inlet line 11. As explained in my prior patent, the breather line 33 provides a means whereby gas may flow into and out of the regeneration circuit in accordance with the pressure and temperature conditions obtaining within the regeneration circuit and within the main gas inlet line 11.

In describing the operation, it will be assumed that the adsorption tower A has just moved into position 1 with adsorbing tower B having just moved into position 2. These towers have previously been in other positions, as will hereinafter appear, and the tower A is in condition to receive the main gas stream flow therethrough. Tower B, which is in position No. 2, has been moved out of the regeneration circuit and at the start of the adsorbing cycle is in a heated but regenerated condition. Tower C is in position No. 3, having just been moved from position No. 1, where it has adsorbed the hydrocarbon fractions from the main stream during the preceding adsorption cycle.

The main gas stream, which may be a natural gas to be conducted into a pipe line, flows from main gas stream inlet 11 and through the branch line 12 into and through the adsorbent bed 10 of tower A which functions as a first adsorption stage zone. From the tower A said main gas stream stripped of the adsorbable hydrocarbon fractions, is discharged through the conductor 14 and flows past the flow splitter valve 16. The position of the flow splitter valve is adjusted by means of the control device 20, and, assuming that the device 20 is actuated by the temperature of the discharging main gas stream, the adjustment of the splitter valve is in accordance with such temperature. It might be noted that where a gas stream is directed into a pipeline, it is desirable that its maximum temperature be held within certain limits, and the device 20 is adjusted in accordance with such limits.

Remembering that the tower B, which is in position No. 2 at this time, has just moved out of the regeneration circuit and has its bed 110 in a heated condition, it is necessary that said tower be first cooled or at least partially cooled in order to place it in condition to act as a second stage adsorption zone. In order to accomplish this cooling at the start of the adsorption cycle, a portion of the main gas which has been stripped in tower A and which is flowing down the discharge conductor 14, is diverted through line 17 and into the upper end of tower B; at the start of the adsorption cycle the main stream is efficiently stripped of the hydrocarbon fractions and this lean stripped stream is ideal for cooling purposes without preloading the bed of tower B. The diverted portion of the gas stream passes through the bed 110 of tower B and is conducted from tower B through the line 19 back into the main discharge line 14 downstream of the splitter valve 16. As the diverted portion of gas flows through bed 110, it functions to pick up the heat from said bed and to flush said heat outwardly with the discharging main gas stream. Because the temperature of the main stream must be held within certain limits, it is necessary to control the position of the flow splitter valve 16 in order to divert more or less volume of gas through the hot bed 110.

Normally, at the start of the adsorption cycle when the bed 110 is in a heated position, only a relatively small volume of gas is diverted through tower B so that the amount of heat which is put into the final discharging main gas stream is limited. As cooling of the bed 110 procceds, it is possible to divert more of the main gas stream through bed 110, and this action continues until the bed 110 of tower B is in condition for adsorption of the adsorbable hydrocarbon fractions. It is noted that the bed 110 will be cooled progressively from its upper end downwardly and, therefore, some second stage adsorption may begin in the upper portion of the bed prior to the time that the entire bed is totally and completely cooled. As flow of diverted gas continues, cooling of the entire bed is completed. Thus, the freshly regenerated tower B, which is initially hot at the start of the adsorption cycle, is progressively cooled off by the effluent main gas stream from the tower A, and is made available for a second adsorption stage as the adsorption cycle progresses.

At the start of an adsorption cycle the gas flowing through the discharge conductor 14 from the tower A is extremely well stripped, and at that time a second adsorption stage is not required. The lean effluent gas from tower A makes an ideal cooling stream for the hot bed 110 of the tower B, and as the adsorption cycle progresses an increased volume of the gas from the discharge conductor 14 may be diverted through the tower B because the cooling of said tower will proceed rapidly as the cycle continues. As the adsorption cycle continues through tower A, the bed 10 becomes more and more saturated and adsorption efficiency lowers, with the result that the effluent gas from tower A becomes richer in the hydrocarbon fractions which it is desired to recover. At such time, a second stage adsorption is desirable, and by the time that this condition occurs, that is, the effluent gas from tower A is richer in hydrocarbon adsorbable fractions, the bed 110 of tower B has been sufficiently cooled at least throughout the upper portion, to be in condition for adsorption. At this time, the control 20 would automatically adjust the splitter valve 16 to divert a greater volume of the effluent gas from tower A into tower B, and a second stage adsorption together with completion of cooling of the entire bed will be carried out in the bed 110 of tower B whereby a high overall extraction efficiency is accomplished. By providing for efficient extraction, the discharging gas which passes out from the line 14 is maintained relatively constant and contains only a low content of the adsorbable fractions.

With the above arrangement, it will be evident that the effluent gas from tower A is utilized during the initial portion of the adsorption cycle to effect a cooling of the hot bed 110 of the tower B. This eliminates the necessity of any cooling period in the actual regeneration cycle, and reduces the cycle time. After the bed 110 of tower B has been cooled, said bed then becomes available for a second adsorption stage. In actual practice, the need for a second adsorption stage is not necessary until the bed 10 in tower A has become fairly well saturated, and by the time this occurs the bed 110 of tower B is available to act as a second stage adsorption zone. The net result is that extremely efficient extraction of the adsorbable hydrocarbon fractions from the main gas stream is accomplished.

While the towers A and B are on the adsorption cycle as above described, the tower C is being regenerated. As noted, this tower is in position No. 3 and has just been switched from position No. 1 wherein it has become saturated by reason of being on an adsorption cycle, forming the first stage adsorption zone of said cycle. The regeneration cycle consists of a heating period only, and the regeneration gas is circulated from the heater 22 through line 23 and branch 23' into the upper end of tower C. The regeneration gas passes through the bed 210 of tower C to pick up the hydrocarbon liquid fractions in vaporized form and said gas is then passed through the heat exchangers 27 and 28 which effect a cooling thereof. In connection with the heat exchanger 28, it would be possible to direct the discharging main gas stream through the heat exchanger 28 in the manner disclosed in my prior Patent No. 2,880,818; however, any suitable source of cooling may be circulated through this heat exchanger.

After being cooled by the heat exchanger action, the hydrocarbon fractions in the gas stream are condensed and in passing through separator 29 are separated from the regeneration gas stream. The recovered liquids are withdrawn through the discharge line 30. The regeneration gas is then returned by the pump 31 to the heater 22 to complete the circuit and the cycle is repeated. Since the regeneration gas circuit is separate and independent of the main gas stream, and since its gas is confined therein, a relatively small volume of regeneration gas is necessary. This means that such gas may be heated to a relatively high degree to effect a regeneration of the bed 210 in tower C in a minimum length of time.

After a predetermined time period, the adsorption cycle and regeneration cycle are complete. At this time, the tower A has its bed 10 substantially well saturated with adsorbable hydrocarbon fractions while the bed 110 of tower B has only a part of its bed saturated with adsorbable fractions since this latter bed has functioned only as a second stage adsorption zone during the latter part of the adsorption cycle. The bed 210 of the tower C has been fully regenerated or reactivated and is in a heated condition.

Upon completion of the adsorption cycle, the flows through the various towers are switched and such switching places the tower A in position No. 3 connecting this tower into the regeneration circuit. Tower B is moved from position No. 2 to position No. 1 while the hot regenerated tower C is moved from position No. 3 to position No. 2. Upon the next succeeding cycle of operation, tower B becomes the first stage adsorption zone, and tower C forms the second stage adsorption zone. However, as heretofore described, the initial flow through the now second stage adsorption tower C will cool said tower after which said tower is in condition to act as said second adsorption stage.

During the time that towers B and C are on an adsorption cycle, the tower A is connected in the regeneration circuit and will be regenerated by the circulation of the hot regeneration gas stream therethrough. It is noted that the volume of each of the towers with respect to the regeneration circuit is relatively large. When tower A, for example, after being saturated, is switched into the regeneration circuit, its volume becomes a part of such circuit. Some of the main gas stream will be trapped in the spaces within the bed of the tower and this main gas stream is considerably leaner than the regeneration gas which is constantly circulating through the regeneration circuit. Therefore, as the tower A is connected in the regeneration circuit, a certain volume of leaner gas will be admixed with the richer regeneration gas to produce a net reduction in the richness of the regeneration gas. This action conditions the regeneration circuit to render the gas in said circuit more effective in vaporizing the adsorbable hydrocarbon fractions. Of course, some conditioning of the regeneration circuit would probably occur through the breather line or connection 33 because toward the end of each regeneration cycle and due to the condensation of the certain hydrocarbon fractions and separation thereof from the regeneration stream, a net cooling effect in the stream would be produced. Any cooling of the regeneration stream would allow a breathing in or flow of main gas stream into the regeneration circuit through line 33 to dilute said regeneration gas whereby it will more efficiently extract the hydrocarbon fractions upon the succeeding regeneration cycle.

Upon completion of the cycle of operation in which towers B and C have been on adsorption and tower A has been on regeneration, the flow through the towers is again switched to move tower B which was on first stage adsorption from position 1 to position 3, whereby tower B is placed on regeneration. At the same time tower C moves from its position No. 2 to position 1 to become the first adsorption stage and tower A moves to position No. 2 to become the second stage adsorption. The operation is then repeated with towers C and A on adsorption and tower B on regeneration. The operation continues with successive shifting in the manner above described, and thus a cyclic type operation is converted to a substantially continuous one.

By controlling the position of flow splitter valve 16 in accordance with the temperature of the main discharge line, the cooling of the tower which forms the second adsorption stage may be carried out as rapidly as conditions will permit. It is desirable to direct as much of the stripped effluent gas as is possible from the first adsorption stage during the initial portion of the adsorption cycle in order to effect as fast a cooling of the bed of the second adsorption stage. Actually, the cooling of the upper portion of the second adsorption stage is complete by the time any need for a second adsorption stage occurs, and after the bed of the second adsorption stage has been completely cooled, increased volumes of the main gas stream may be diverted from the conductor 14 through line 17. During the extreme latter portion of the adsorption cycle it might be possible that all of the main gas is diverted through the second adsorption stage. The ultimate result is that a second adsorption stage is provided when necessary to assure efficient extraction of the desirable adsorbable hydrocarbon fractions. By utilizing the effluent from the first adsorption stage to cool the bed of the second adsorption stage, the necessity for any cooling period during the regeneration of a particular bed is eliminated. Thus, the regeneration gas can be constantly heated with the net result that the regeneration cycle time is materially reduced. In addition, a smaller heater which effects an economic saving may be employed because the regeneration gas stream does not vary across a very great range of temperature as would be the case where heating and cooling periods of the regenerating gas are required.

In FIGURE 2, a slightly modified form of the invention is illustrated wherein a gas to gas heat exchanger 35 is connected in the discharge line 19 which extends from the second stage adsorption tower B. As illustrated in FIGURE 2, the discharge line 19 extending from tower B passes through the heat exchanger 35 just prior to its reconnection with the main gas stream discharge conductor 14 where the diverted stream and the main gas stream are recombined. The discharge line 32 of the regeneration gas circuit pump 31 passes through the heat exchanger 35 and then extends to the heater 22.

With this arrangement the hot gas stream which is flowing from the tower B during the initial part of the adsorption cycle is passed in heat exchange relationship with the cool regeneration gas stream, it being noted that the outlet of the pump 32 is directing cool regeneration gas back to the heater. The heat from the gas in line 19 is thus transferred to the regeneration gas stream and results in a saving of some of the regeneration heat which, of course, was retained in tower B at the time said tower was switched from position 3 to position 2. In addition to saving some of the heat of regeneration, the provision of the heat exchanger 35 greatly speeds up the cooling of the bed 110 within the tower B. This is true because the control device 20 has adjusted the splitter valve 16 in accordance with the maximum permissible temperature of the recombined discharging stream passing out through conductor 14. By removing a part of the heat which is discharging through line 19, there will be a lesser net increase in temperature in the final discharge line, with the result that the spliter valve 16 may be initially adjusted to direct a greater volume of the main gas stream through tower B. By diverting a greater volume of gas through tower B during the initial part of the absorbing cycle, a greater amount of heat is removed from the bed 110. A portion of this heat is returned to the regeneration circuit prior to recombining of the diverted stream with the main stream, and therefore a lesser overall temperature increase will occur in the discharge line 14. By increasing the rapidity of cooling of the second adsorption stage, which is shown in FIGURE 2 as tower B, such tower will be available as a second stage adsorption earlier in the adsorption cycle.

In FIGURES 1 and 2 the towers A, B and C, together with the connecting lines and valves, have been shown more or less schematically, and the details of the complete connections have been omitted for the sake of clarity. Although any suitable type of valve connections and controls may be employed for shifting the flows through the towers A, B and C to shift said towers from positions 1, 2 and 3 in the manner hereinbefore described, one type of control arrangement is illustrated in FIGURE 3.

FIGURE 3 illustrates tower A in position No. 1, tower B in position No. 2, and tower C in position No. 3. The main gas inlet line 11 is illustrated as connected with the branch line 13 extending to tower A. Discharge conductor 14 having valve 15 therein is shown as extending through the splitter valve 16 in substantially the same manner as shown in FIGURES 1 and 2. Also shown is the diverting line 17 having valve 18 which extends to the upper end of tower B. In actual construction the upper end of line 17 connects into a branch line 12a, similar to line 12, which is connected with the main gas stream inlet line 11. Line 12a has a suitable control valve 13a therein. The discharge conductor 19 with the offset branch 19' and valve 20 is also illustrated and in FIGURE 3 the heat exchanger 35 of FIGURE 2 is shown. Line 19 as explained reconnects with the discharge line 14 to recombine the diverted stream with the main gas stream.

For placing tower B in position No. 1, the valve 13a is opened, valves 18 and 20 are closed, and main gas flow is through the branch line 12a into the tower. The main gas stream is discharged from tower B through 19, and with valve 20 closed passes into a branch line 14a having connection with the main discharge line 14. A suitable valve 15a in branch 14a is open at this time.

When tower B has moved to position 1 and the main flow is through said tower as above described, tower C becomes the second adsorption stage or zone. In such event the gas flow after passing through tower B is diverted through a portion of line 17 and then through a branch conductor 17a having control valve 18a therein. The upper end of conductor 17a communicates with a branch line 12b having a control valve 13b therein. Discharge of the diverted gas stream from tower C is through line 19a, through an offset line 19", past valve 20 and into the return line 19. Line 19a extending from the tower C also has connection with the main discharge conductor through a branch 14b having a valve 15b therein; valve 15b is closed when tower C functions as a second stage adsorption zone or when said tower is on regeneration.

Thus, with towers B and C on adsorption, valves 13a, 15a, 18a and 20a are open and valves 13b, 15b, 18 and 20 are closed. Flow of main gas is then through tower B, line 19, branch line 14a, and into the main discharge conductor 14 past the splitter valve 16. A portion of the gas from discharge conductor 14 is diverted through a part of lines 17 and 17a, and branch line 12b into the upper end of tower C. From tower C the diverted gas is discharged through line 19a, offset 19', past open valve 20a and into the return line 19, where it is finally recombined with the main gas stream in the discharge conductor 14. Of course, valves 24 and 26, which may connect tower C in the regeneration circuit, are closed as are valves 24a, 26a, 13, 15, 18b and 20b; valves 24b and 26b are open when tower A is on regeneration.

When tower C is moved to position No. 1, tower A assumes position No. 2, and tower B assumes position No. 3. In such case, tower C is the first adsorption stage and tower A is the second adsorption stage. In this event, valves 13b and 15b are opened and valves 18a and 20a are closed; also regeneration circuit valves 24 and 26 are closed. The main gas stream discharges from tower C through line 19a, branch 14b, valve 15b and into the main discharge conductor 14. A portion of the main gas stream flow is diverted by valve 16 through line 17 and through a branch conductor 17b having a control valve 18b therein. The upper end of branch conductor 17b connects with the branch inlet line 12 leading to tower A. The diverted gas passes outwardly from tower A through a part of the main discharge 14 and then through an offset connection 19b having a valve 20b therein. Offset connection 19b communicates with the return line 19.

With tower C forming the first adsorption stage, and tower A forming the second adsorption stage, the main gas flow is from the inlet line 11 past valve 13b and into branch line 12b leading to the upper end of tower C. From tower C, flow is outwardly through lines 19a and 14b into the main discharge conductor 14. The diverted portion of the gas flows through line 17, branch line 17b, and into the upper end of tower A; of course, at this time valve 13 connected in line 12 and extending from the main inlet line 11, as well as valve 15 in the main discharge conductor 14, are closed. The diverted gas stream passes from tower A through a portion of discharge line 14, offset connection 19b, and into the return line 19.

While towers C and A are on adsorption, tower B is connected in the regeneration circuit. This connection is effected by a branch line 23a which establishes communication between the main regeneration line 23 and the upper end of tower B. Branch line 23a has a suitable control valve 24a. Regeneration gas is discharged from tower B through a branch conduit 25a having a control valve 26a therein and also having connection with line 25 leading to the heat exchanger 27.

When tower A is on regeneration, communication between the regeneration line 23 and the upper end of tower A is established by branch 23b having a suitable control valve 24b therein. Regeneration gas is conducted from the lower end of tower A through a conduit 25b provided with a suitable control valve 26b. The conduit 25b also has connection with the line 25 of the regeneration circuit which extends to the heat exchanger 27.

From the foregoing it will be seen that by properly opening and closing the various valves, any two of the towers may be placed on the adsorption cycle, with the third tower being connected in the regeneration circuit. The valves are shown schematically, and are preferably pressure-actuated or other remotely operated valves which are automatically controlled. The automatic control equipment, which is generally known in the art, may be of any desired type, and functions to properly operate the valves to effect the desired shifting of flows through the towers at the end of each adsorption cycle in the manner heretofore described.

In connection with FIGURES 1 to 3 it has been assumed that the control device 20 which controls the volume of the main gas stream which is diverted through the second adsorption stage or zone is actuated in accordance with the temperature of the gas in the main discharge line. However, other conditions of the discharging main gas stream may be used as the control factor, for example, a control device which is responsive to the composition of the main gas stream may be employed. Where a control of the diverted main gas stream is in accordance with the composition of the main gas stream, it is possible to maintain the composition of said stream substantially constant and by so doing, the particular hydrocarbon fractions which are ultimately extracted and recovered will be controlled. Such control will assure that the liquids recovered from the separator 29 of the regeneration circuit will be of a substantially steady-state composition.

In cyclic types of adsorption apparatus, it has been found that the ultimate recovery of liquids usually varies considerably throughout the adsorption cycle insofar as its final composition is concerned. In other words, during the first portion of liquid recovery the liquids so recovered will be of a different composition than the latter portion of the recovery cycle. However, by controlling the splitter valve 16 and thereby controlling the volume of gas passing through the second adsorption stage in accordance with composition of the discharging main gas stream, a control of the fractions being adsorbed is effected with the net result that a fairly steady-state adsorption process is accomplished which produces a discharge gas with a fairly constant composition throughout the complete cycle.

In FIGURE 4, another modification of the invention is illustrated, and for the sake of clarity the various control valves and lines, such as illustrated in FIGURE 3, have been omitted. In this form of the invention the diverted gas return line 19 which extends from the particular tower forming the second adsorption stage has a three-way valve 36 connected therein. This valve is adapted to direct the flow from the return line 19 either through a branch conduit 19c back to the main discharge conductor 14 downstream of the splitter valve 16, or is adapted to direct the flow into a line 32a which extends to the inlet side of the heater 22. The outlet side of pump 30 has connection through a conductor 32b with the three-way valve 36. When the valve 36 is in one position, the operation is as heretofore described, that is, the diverted gas stream flowing from the second stage adsorption tower is returning through conduit 19c to the main discharge conductor 14. However, when the valve 36 is in its other position, the flow from return line 19 is directed into the conductor 32a which extends to the heater 25, and is therefore connected in the regeneration circuit. The operation of the valve 36 is controlled by a suitable time control unit, generally indicated at 37.

In the operation of this form of the invention, and assuming towers A and B to be on adsorption, the main gas stream is directed through tower A which constitutes the first adsorption stage and is discharged through conductor 14 past the splitter valve 16. A portion of the main gas is diverted through line 17, through tower B, and into the return line 19. At the beginning of the adsorption cycle, the control device 37 has actuated the valve 36 to place it in a position to communicate the return line 19 with the conductor 32a extending to the heater 25 of the regeneration circuit. Thus, during the first part of the adsorption cycle the hot effluent gas stream discharging from the tower B is directed into the regeneration circuit. Flow through this circuit is from conductor 32a, through heater 25, lines 23 and 23', tower C, line 25, heat exchangers 27 and 28, separator 29, pump 30, and then through the breather line or connection 33 to be returned to the main gas inlet line 11. During this period the outlet line 32 from the pump 30 is blocked by the three-way valve 36.

The diversion of a large portion of the hot effluent gas from tower B into the regeneration circuit returns mose of the hot gas into the circuit, and thus most of the regeneration heat from the bed 110 of tower B which would be otherwise flushed down the discharge conductor 14 is returned to the regeneration circuit. At the same time, the bed 110 of tower B is purged of any rich gas which has remained therein from the regeneration cycle with such rich gas being returned to the regeneration circuit. By returning substantially all of the regeneration heat to the regeneration circuit, a very rapid coopling of the bed 110 of tower B is accomplished, thereby making it available for full scale second stage adsorption early in the adsorption cycle without causing any undesirable high temperature wave in the main discharge line 14.

The gas from the return line 19 is diverted into the regeneration gas circuit only during the first part of the regeneration cycle. During this period the trapped enriched gas in tower B, as well as most of the residual heat of tower B, is directed into the regeneration circuit. The time control or other control device 37 is so adjusted to stop the flow of diverted gas from line 19 into the regeneration circuit prior to the time that the heat wave of hot regeneration gas stream has worked its way through the bed 210 of the tower C; by the time that the heat wave has moved through the bed of tower C, the vaporized products which are being stripped from said bed will be carried out through line 25 into the condensing and separating zones formed by the heat exchangers 27 and 28 and the separator 29. As vaporized products begin to move from the tower C through line 25, the valve 36 is actuated to shut off communication between the return line 19 and the regeneration circuit, so that thereafter the diverted gas stream which is passing through tower B is returned to the main discharge line. When the removal of vaporized products from tower C begins, it is no longer necessary or desirable to continue to divert a portion of the gas from line 19 into the regeneration circuit, and therefore either at or prior to this time the control means 37 activates the valve. For the remainder of the cycle, the regeneration circuit is operated in the manner hereinbefore described wherein the regeneration gas merely circulates through its system and has the breather line connection 33 with the main gas stream.

It might be noted in connection with FIGURE 4, that not only does this arrangement save the heat of regeneration and also return the rich gas to the regeneration stream during the start of the adsorption cycle, but also a conditioning of the regeneration gas circuit is accomplished. As has been noted, the main dicharge gas stream is very lean as compared to the gas which is circulating within the regeneration system. By diverting a portion of the main gas stream through the tower B and then passing this gas into the regeneration circuit, the regeneration gas stream is diluted and this increases its efficiency in subsequently extracting and removing hydrocarbon fractions from the stream. It is of course evident that suitable lines and valves, together with satisfactory automatic controls, would be employed in the form shown in FIGURE 4.

In all forms of the invention the apparatus comprises three towers which are designed so that two of said towers operate on an adsorption cycle at one time with the third tower being on regeneration. The first tower provides a first adsorption stage, while the second tower is connected in the adsorption cycle while in a heated condition. A portion of the main gas stream is utilized to cool this hot adsorption tower so that no cooling period is necessary in the actual regeneration cycle. Since cooling is accomplished during the first part of the adsorption cycle, the second tower is made available as a second adsorption stage at a time when such second adsorption stage is needed. By eliminating any cooling period in the regeneration cycle itself, the cycle can be shortened insofar as time is concerned, and also heating requirements are reduced so that more economic operation may be obtained. By automatically controlling the volume of the diverted gas, it is possible to maintain a control of the composition and the temperature of the main stream. The control of the composition of the main gas stream discharging through line 14 results in a control of the composition of the recovered liquids.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. The process of recovering hydrocarbon liquid fractions from a main gas stream including, flowing during one complete adsorption cycle a main gas stream through a first adsorption zone which forms a first adsorption stage to remove hydrocarbon fractions from said main gas stream, diverting during the first part of said adsorption cycle a portion of said main gas stream after it has passed through the first adsorption zone through a second adsorption zone to begin cooling of said second zone, continuing the diverting of the main gas stream through said second zone throughout the remainder of the adsorption cycle to complete cooling and to adsorb additional hydrocarbons in said second zone which forms a second adsorption stage, increasing the volume of the diverted gas during the latter portion of the adsorption cycle of the first adsorption zone, recombining the diverted gas after its passage through said second zone with the main gas stream, and simultaneously directing a heated regeneration gas stream through a third adsorption zone to extract hydrocarbon fractions from a third adsorption zone which hydrocarbon fractions were removed from the main gas stream on a preceding adsorption cycle, and thereafter condensing and separating the extracted hydrocarbon fractions to recover the same as a liquid product.

2. The process as set forth in claim 1, together with the additional step of continuously controlling the volume of that portion of the main gas stream which is diverted through the second adsorption zone to control the cooling and the adsorption which occurs in said second adsorption zone.

3. The process as set forth in claim 1, wherein the diverted portion of the main gas stream which flows through the second adsorption zone during the first part of the adsorption cycle cools said second adsorption zone sufficiently to render it available as a second adsorption stage, and thereafter during the remainder of the adsorption cycle controlling the volume of said diverted portion of the main gas stream by conditions obtaining in the recombined main gas stream to control the adsorption which occurs in said second zone which functions as a second adsorption stage.

4. The process as set forth in claim 1, together with the step of passing the diverted portion of the main gas after its passage through said second zone in heat exchange relationship with the regeneration gas stream prior to the recombining of the diverted gas with the main gas stream.

5. The process as set forth in claim 1, with the additional steps of, placing the second and third adsorption zones on an adsorption cycle by shifting the main gas stream flow through the second zone which functions as the first adsorption stage and diverting a portion of said main gas stream through the third zone which functions as the second zone, and simultaneously placing the first zone on a regeneration cycle by directing the heated regeneration gas through said first adsorption zone, whereby said regeneration gas extracts the adsorbed hydrocarbons from said first adsorption zone.

6. The process of recovering hydrocarbon liquid fractions from a main gas stream including, flowing the main gas stream through a first bed of adsorbent material forming a first adsorption stage to remove adsorbable hydrocarbon fractions therefrom, discharging the stripped main gas stream from said bed, diverting a portion of the stripped main gas stream through a second bed of adsorbent material forming a second adsorption stage to cool said bed and to thereafter subject the diverted portion of the main gas stream to a second stage adsorption, said diverting of a portion of the stripped main gas being accomplished by initially diverting a relatively small portion thereof during the first part of the adsorption cycle in the first adsorption stage and then gradually increasing said volume of said diverted portion until the end of said adsorption cycle, recombining said diverted portion of the gas after its passage through the second bed with the main gas stream, circulating a regeneration gas through a regeneration circuit which includes a third bed of adsorbent material and also includes a heating zone upstream of said third bed and a condensing and separating zone downstream of the third bed but upstream of the heating zone, said regeneration gas being heated and circulated through said third bed to extract hydrocarbon fractions therefrom which fractions are subsequently condensed and separated as said regeneration gas flows through the condensing and separating zone, and establishing a constant communication between the regeneration circuit and a source of gas which is outside of said circuit, whereby a flow in either direction but in only one direction at a time between said regeneration circuit and said outside gas source may occur.

7. The process as set forth in claim 6, together with the additional steps of shifting the flow through the beds after a predetermined time period to direct the main gas stream flow through the second bed which becomes the first adsorption stage and to divert a portion of the main gas stream through the third bed which becomes the second stage, and connecting the first bed into the regeneration circuit to extract the previously adsorbed hydrocarbon fractions therefrom and to regenerate said third bed.

8. The process as set forth in claim 7, with the further step of again shifting flow through the beds after a predetermined time period to direct the main gas stream flow through the third bed which then functions as the first adsorption stage and to divert a portion of the main gas stream through the first bed which then functions as the second adsorption stage, and connecting the second bed into the regeneration circuit to extract the previously adsorbed hydrocarbon fractions therefrom and to regenerate said third bed.

9. The process set forth in claim 6, together with the step of passing the diverted portion of the main gas stream, after its passage through the second adsorbent bed but prior to its recombining with the main gas stream, in heat exchange relationship to the regeneration gas stream at a point in the regeneration circuit between the outlet side of the condensing and separating zone and the inlet side of the heating zone.

10. The process of recovering hydrocarbon liquid fractions from a main gas stream including, flowing the main gas stream through a first bed of adsorbent material forming a first adsorption stage to remove adsorbable hydrocarbon fractions therefrom, discharging the stripped main gas stream from said bed, diverting a portion of the stripped main gas stream through a second bed of adsorbent material forming a second adsorption stage to cool said bed and to thereafter subject said diverted portion of the main gas stream to the second adsorption stage, circulating a regeneration gas through a regeneration circuit which includes a third bed of adsorbent material and also includes a heating zone upstream of said third bed and a condensing and separating zone downstream of the third bed but upstream of the heating zone, said regeneration gas being heated and circulated through said third bed to extract hydrocarbon fractions therefrom which fractions are subsequently condensed and separated as said regeneration gas flows through the condensing and separating zone, establishing a constant communication between the regeneration circuit and a source of gas which is outside of said circuit, whereby flow in either direction but in only one direction at a time may occur between said regeneration circuit and said outside gas source, conducting during the first part of the adsorption cycle the diverted portion of the main gas stream after its passage through the second zone into the regeneration circuit at a point upstream of the inlet side of the heating zone, discontinuing the conducting of said diverted portion into the regeneration circuit when the regeneration gas in said circuit begins to strip hydrocarbon liquid components from said third zone, and thereafter during the remainder of the adsorption cycle recombining said diverted portion of the gas after its passage through said second zone with the main gas stream.

11. The process as set forth in claim 10, with the step of controlling the flow of the diverted portion into the regeneration circuit in a predetermined time relationship with respect to the complete regeneration cycle.

12. The process as set forth in claim 10, with the additional step of controlling the volume of the diverted portion of the main gas stream in accordance with the composition of the discharging recombined main gas stream.

13. The process as set forth in claim 10, with the additional step of controlling the volume of the diverted portion of the main gas stream in accordance with the temperature of the discharging recombined main gas stream.

14. An apparatus for recovering hydrocarbon liquid fractions from a main gas stream including, a first bed of adsorbent material forming a first adsorption stage, a second bed of adsorbent material forming a second adsorption stage, an inlet conductor connected with said first bed for directing a main gas stream therethrough whereby adsorbable hydrocarbon fractions are removed from the stream as it passes through said bed, a discharge conductor extending from said first bed for conducting the stripped main gas stream therefrom, a splitter valve means in said discharge conductor, a diverting line extending from the valve means to said second bed whereby a predetermined portion of the main gas stream flowing through said discharge conductor may be diverted through the second bed, a return line extending from the outlet side of the second bed to the discharge conductor at a point downstream of the valve means whereby the diverted portion of said main gas stream may be recombined with the main stream, means in the outlet end of the discharge conductor responsive to the condition of the discharging recombined stream for adjusting the valve means to control the volume of gas which is diverted through the second bed, a third bed of adsorbent material, a regeneration gas circuit including a heater, a condensing and liquid separating means and a circulating pump and means for connecting said third bed into said regeneration gas circuit whereby said third bed may be regenerated while the first and second beds are on an adsorption cycle.

15. An apparatus as set forth in claim 14, together with a heat exchanger connected in the return line and also connected in the regeneration circuit at a point in said circuit between the outlet side of the condensing and liquid separating means and the inlet side of the heater, whereby the diverted portion of gas discharging from the second bed is passed in heat exchange relationship with the regeneration gas.

16. An apparatus as set forth in claim 14, together with a selector valve having connection with the return line and also having connection with the regeneration circuit, means for actuating the selector valve to direct the diverted gas discharging from the second bed into the regeneration circuit during the first portion of the adsorption cycle and to direct the diverted gas into the discharge conductor during the latter portion of the cycle.

17. The method of removing water and recovering condensable hydrocarbons from a main flow stream of natural gas which includes; contacting a bed of adsorbent material with the main flow stream of natural gas, whereby water and condensable hydrocarbons are adsorbed by the bed material; heating a reactivation flow stream of natural gas, whereby the vaporizing capacity of the reactivating flow stream is raised; contacting the bed of adsorbent material with the heated reactivation flow stream; cooling the reactivation flow stream to its dew point, whereby water vaporized from the bed is removed and condensable hydrocarbons are recovered; diverting at least a portion of the main flow stream after the stream has water and hydrocarbons adsorbed from it; cooling the bed with the diverted portion of the main flow stream, whereby the bed is prepared to be again contacted with the main flow stream of natural gas to remove water and hydrocarbons from the main flow stream by adsorption; returning the diverted portion of the main flow stream to the undiverted remainder of the main flow stream; sensing the temperature of the main flow stream after the diverted portion has cooled the bed and returned to the main flow stream; and utilizing the temperature of the mixture of the main flow stream and diverted portion to control the size of the diverted portion of the main flow stream cooling the bed.

18. The process of recovering hydrocarbon liquid fractions from a main gas stream including flowing during one complete adsorption cycle a main gas stream through a first adsorption zone which forms a first adsorption stage to remove hydrocarbon fractions from said main gas stream, diverting during the first part of said adsorption cycle a portion of said main gas stream after it has passed through the first adsorption zone through a second adsorption zone to begin cooling of said second zone, continuing the diverting of the main gas stream through said second zone throughout the remainder of the adsorption cycle to complete cooling and to adsorb additional hydrocarbons in said second zone which forms a second adsorption stage, recombining the diverted gas after its passage through said second zone with the main gas stream, simultaneously directing a heated regeneration gas stream through a third adsorption zone to extract hydrocarbon fractions from a third adsorption zone which hydrocarbon fractions were removed from the main gas stream on a preceding adsorption cycle, and thereafter condensing and separating the extracted hydrocarbon fractions to recover the same as a liquid product and controlling the volume of the main gas stream which is diverted through the second adsorption zone by utilizing the composition of the recombined main gas stream to adjust the volume of the diverted gas, whereby the control of the volume of diverted gas is in accordance with the composition of the recombined main gas stream.

19. The process of recovering hydrocarbon liquid fractions from a main gas stream including, flowing during one complete adsorption cycle a main gas stream through a first adsorption zone which forms a first adsorption stage to remove hydrocarbon fractions from said main gas stream, diverting during the first part of said adsorption cycle a portion of said main gas stream after it has passed through the first adsorption zone through a second adsorption zone to begin cooling of said second zone, continuing the diverting of the main gas stream through said second zone throughout the remainder of the adsorption cycle to complete cooling and to adsorb additional hydrocarbons in said second zone which forms a second adsorption stage, recombining the diverted gas after its passage through said second zone with the main gas stream, simultaneously directing a heated regeneration gas stream through a third adsorption zone to extract hydrocarbon fractions from a third adsorption zone which hydrocarbon fractions were removed from the main gas stream on a preceding adsorption cycle, and thereafter condensing and separating the extracted hydrocarbon fractions to recover the same as a liquid product, and controlling the volume of the main gas stream which is diverted through the second adsorption zone by utilizing the temperature of the recombined main gas stream to adjust the volume of the diverted gas, whereby the control of the volume of diverted gas is in accordance with the temperature of the recombined main gas stream.

20. The process of recovering hydrocarbon liquid fractions from a main gas stream including, flowing the main gas stream through a first bed of adsorbent material forming a first adsorption stage to remove adsorbable hydrocarbon fractions therefrom, discharging the stripped main gas stream from said bed, diverting a portion of the stripped main gas stream through a second bed of adsorbent material forming a second adsorption stage to cool said bed and to thereafter subject the diverted portion of the main gas stream to a second stage adsorption, recombining said diverted portion of the gas after its passage through the second bed with the main gas stream, circulating a regeneration gas through a regeneration circuit which includes a third bed of adsorbent material and also includes a heating zone upstream of said third bed and a condensing and separating zone downstream of the third bed but upstream of the heating zone, said regeneration gas being heated and circulated through said third bed to extract hydrocarbon fractions therefrom which fractions are subsequently condensed and separated as said regeneration gas flows through the condensing and separating zone, establishing a constant communication between the regeneration circuit and a source of gas which is outside of said circuit, whereby a flow in either direction but in only one direction at a time between said regeneration circuit and said outside gas source may occur and controlling the volume of the diverted portion of the main gas stream in accordance with the composition of the recombined main gas stream.

21. The process of recovering hydrocarbon liquid fractions from a main gas stream including, flowing the main gas stream through a first bed of adsorbent material forming a first adsorption stage to remove adsorbable hydrocarbon fractions therefrom, discharging the stripped main gas stream from said bed, diverting a portion of the stripped main gas stream through a second bed of adsorbent material forming a second adsorption stage to cool said bed and to thereafter subject the diverted portion of the main gas stream to a second stage adsorption, recombining said diverted portion of the gas after its passage through the second bed with the main gas stream, circulating a regeneration gas through a regeneration circuit which includes a third bed of adsorbent material and also includes a heating zone upstream of said third bed and a condensing and separating zone downstream of the third bed but upstream of the heating zone, said regeneration gas being heated and circulated through said third bed to extract hydrocarbon fractions therefrom, which fractions are subsequently condensed and separated as said regeneration gas flows through the condensing and separating zone, establishing a constant communication between the regeneration circuit and a source of gas which is outside of said circuit, whereby a flow in either direction but in only one direction at a time between said regeneration circuit and said outside gas source may occur and controlling the volume of the diverted portion of the main gas stream in accordance with the temperature of the recombined main gas stream.

22. A system for removing water and recovering condensable hydrocarbons from a main flow stream of natural gas which includes; a bed of adsorbent material; a first circuit for the main flow stream of natural gas including the bed of adsorbent material, whereby the natural gas passing through the bed has its water and condensable hydrocabons retained by the bed; a second circuit closed into a circulating path for a reactivation flow stream of gas, a heater for the reactivation flow stream; means for including the bed of adsorbent material in the second circuit after the bed has removed water and condensable hydrocarbons from the main flow stream, means for cooling the reactivation flow stream after it has flowed in the second circuit from the bed until the dew point of the stream is reached and recovery of the condensable hydrocarbons is made; a third circuit for diverting at least a portion of the main flow stream after the stream has water and hydrocarbons adsorbed from it; means for including the bed of adsorbent material in the third circuit to cool the bed, whereby the bed is prepared to be again contacted with the main flow stream of the first circuit to remove water and hydrocarbons from the stream by adsorption; means for returning the diverted portion of the main flow stream of the third circuit to the main flow stream of the first circuit; temperature responsive means positioned in the main flow stream of the first circuit downstream of the point at which the diverted portion is returned to the undiverted remainder of the main flow stream in order to respond to the temperature of the mixture of the streams; and control means regulated by the temperature responsive means to adjust the amount of the main flow stream of gas diverted into the third circuit.

23. The method of removing water and recovering condensable hydrocarbons from a main flow stream of natural gas which includes: contacting a bed of adsorbent material with the main flow stream of natural gas, whereby water and condensable hydrocarbons are adsorbed by the bed material; heating a reactivation flow stream of natural gas, whereby the vaporizing capacity of the reactivating flow stream is raised; contacting the bed of adsorbent material with the heated reactivation flow stream; cooling the reactivation flow stream to its dew point, whereby water vaporized from the bed is removed and condensable hydrocarbons are recovered; diverting at least a portion of the main flow stream after the stream has water and hydrocarbons adsorbed from it; cooling the bed within the diverted portion of the main flow stream, whereby the bed is prepared to be again contacted with the main flow stream of natural gas to remove water and hydrocarbons from the main flow stream by adsorption; transferring heat from the diverted portion of the main flow stream to the reactivation flow stream to raise the vaporizing capacity of the reactivation flow stream and conserve the heat input to the system; returning the diverted portion of the main flow stream to the undiverted remainder of the main flow stream; sensing the temperature of the main flow stream after the diverted portion has cooled the bed and returned to the main flow stream; and utilizing the temperature of the mixture of the main flow stream and diverted portion to control the size of the diverted portion of the main flow stream cooling the bed.

24. A sytem for removing water and recovering condensable hydrocarbons from a main flow stream of natural gas which includes: a bed of adsorbent material; a first circuit for the main flow stream of natural gas including the bed of adsorbent material, whereby the natural gas passing through the bed has its water and condensable hydrocabons retained by the bed; a second circuit closed into a circulating path for a reactivation flow stream of gas, a heater for the reactivation flow stream; means for including the bed of adsorbent material in the second circuit after the bed has removed water and condensable hydrocarbons from the main flow stream, means for cooling the reactivation flow stream after it has flowed in the second circuit from the bed until the dew point of the stream is reached and recovery of the condensable hydrocarbons is made; a third circuit for diverting at least a portion of the main flow stream after the stream has water and hydrocarbons adsorbed from it; means for including the bed of adsorbent material in the third circuit to cool the bed, whereby the bed is prepared to be again contacted with the main flow stream of the first circuit to remove water and hydrocarbons from the stream by adsorption; a heat exchanger in which the reactivation flow stream of gas in the second circuit after the reactivation flow stream has been cooled to its dew point is heat exchanged with the portion of the main flow stream in the third circuit after the portion of the main flow stream has cooled the bed of adsorbent material, whereby heat removed from the cooled bed of adsorbent is transferred to the reactivation flow stream initiating its temperature rise to increase the vaporizating capacity of the reactivation flow stream and conserving the heat input to the system, means for returning the diverted portion of the main flow stream of the third circuit to the main flow stream of the first circuit; temperature responsive means positioned in the main flow stream of the first circuit downstream of the point at which the diverted portion is returned to the undiverted remainder of the main flow stream in order to respond to the temperature of the mixture of the streams; and control means regulated by the temperature responsive means to adjust the amount of the main flow stream of gas diverted into the third circuit.

References Cited by the Examiner
UNITED STATES PATENTS

| 1,402,340 | 1/22 | Burrell et al. | 55—180 |
| 2,665,769 | 1/54 | Walker et al. | 55—21 |
| 2,799,362 | 7/57 | Miller | 55—31 |
| 2,880,818 | 4/59 | Dow | 55—62 |
| 2,919,764 | 1/60 | Dillman et al. | 55—163 |
| 2,919,766 | 1/60 | Dillman et al. | 55—33 |
| 2,957,544 | 10/60 | Baker | 55—162 |

REUBEN FRIEDMAN, *Primary Examiner.*
GEORGE D. MITCHELL, HARRY B. THORNTON, WALTER BERLOWITZ, ALLAN BOETTCHER,
*Examiners.*